(12) United States Patent
Lee et al.

(10) Patent No.: US 9,210,354 B2
(45) Date of Patent: Dec. 8, 2015

(54) METHOD AND APPARATUS FOR RECEPTION AND TRANSMISSION

(75) Inventors: Gwang Soon Lee, Daejeon (KR); Hyun Lee, Daejeon (KR); Kug Jin Yun, Daejeon (KR); Bong Ho Lee, Daejeon (KR); Kwanghee Jung, Namyangju-si (KR); Namho Hur, Daejeon (KR); Jin Woong Kim, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 568 days.

(21) Appl. No.: 12/969,179

(22) Filed: Dec. 15, 2010

(65) Prior Publication Data

US 2011/0141364 A1 Jun. 16, 2011

(30) Foreign Application Priority Data

Dec. 15, 2009 (KR) .................. 10-2009-0124521
May 18, 2010 (KR) .................. 10-2010-0046295
Sep. 2, 2010 (KR) .................. 10-2010-0085917

(51) Int. Cl.
*H04N 5/44* (2011.01)
*H04N 13/00* (2006.01)
*H04N 21/236* (2011.01)
*H04N 21/426* (2011.01)
*H04N 21/43* (2011.01)
(Continued)

(52) U.S. Cl.
CPC ......... *H04N 5/4401* (2013.01); *H04N 13/0059* (2013.01); *H04N 13/0066* (2013.01); *H04N 19/597* (2014.11); *H04N 21/23608* (2013.01); *H04N 21/4263* (2013.01); *H04N 21/4305* (2013.01); *H04N 21/4347* (2013.01); *H04N 21/4383* (2013.01); *H04N 21/4621* (2013.01); *H04N 21/631* (2013.01)

(58) Field of Classification Search
None
See application file for complete search history.

(56) References Cited

U.S. PATENT DOCUMENTS 5,936,968 A * 8/1999 Lyons ........................ 370/503
6,118,498 A * 9/2000 Reitmeier .................. 348/725
(Continued)

FOREIGN PATENT DOCUMENTS

KR 10-2007-0061227 6/2007
KR 2008-0051004 A 6/2008
(Continued)

*Primary Examiner* — Gregory Sefcheck
*Assistant Examiner* — Daniel Mitchell
(74) *Attorney, Agent, or Firm* — Nelson Mullins Riley & Scarborough LLP; Anthony A. Laurentano, Esq.

(57) ABSTRACT

Disclosed is a reception apparatus including a basic service reception unit to demodulate and channel-decode a signal received through one broadcasting channel among broadcasting channels for a basic service, and to extract a transport stream, an additional service reception unit to demodulate and channel-decode a signal received through a broadcasting channel for an additional service combined with the basic service, and to extract a transport stream, an integrated demultiplexer to respectively demultiplex the transport stream provided for the basic service and the transport stream provided for the additional service in order to extract at least one transport stream, and a source decoder to respectively decode the demultiplexed transport stream provided for the basic service and the demultiplexed transport stream provided for the additional service in order to broadcast at least one of a basic source and an additional source combined with the basic source.

11 Claims, 6 Drawing Sheets

(51) Int. Cl.
*H04N 21/434* (2011.01)
*H04N 21/438* (2011.01)
*H04N 21/462* (2011.01)
*H04N 21/63* (2011.01)
*H04N 19/597* (2014.01)

(56) References Cited

U.S. PATENT DOCUMENTS

| | | | |
|---|---|---|---|
| 6,922,213 B2 * | 7/2005 | Yamagata | 348/423.1 |
| 7,298,741 B2 * | 11/2007 | Hung | 370/389 |
| 8,111,283 B2 * | 2/2012 | Kim et al. | 348/43 |
| 2004/0090996 A1 * | 5/2004 | Wu et al. | 370/535 |
| 2004/0190629 A1 * | 9/2004 | Cooper et al. | 375/240.26 |
| 2005/0143085 A1 | 6/2005 | Bi et al. | |
| 2005/0166244 A1 * | 7/2005 | Moon | 725/95 |
| 2008/0310499 A1 * | 12/2008 | Kim et al. | 375/240.01 |
| 2009/0064239 A1 * | 3/2009 | Hara et al. | 725/68 |
| 2009/0245393 A1 * | 10/2009 | Stein et al. | 375/240.28 |
| 2010/0064316 A1 * | 3/2010 | Dai et al. | 725/38 |
| 2010/0177791 A1 * | 7/2010 | Turner et al. | 370/509 |
| 2010/0325667 A1 * | 12/2010 | Lee et al. | 725/51 |

FOREIGN PATENT DOCUMENTS

| | | |
|---|---|---|
| KR | 2009-0060530 A | 6/2009 |
| KR | 10-0925270 | 11/2009 |

* cited by examiner

METHOD AND APPARATUS FOR RECEPTION AND TRANSMISSION

CROSS-REFERENCE TO RELATED APPLICATIONS

This application claims the benefit of Korean Patent Applications No. 10-2009-0124521, filed on Dec. 15, 2009, No. 10-2010-0046295, filed on May 18, 2010, and No. 10-2010-0085917, filed on Sep. 2, 2010, in the Korean Intellectual Property Office, the disclosures of which are incorporated herein by reference.

BACKGROUND

1. Field of the Invention

The present invention relates to transmission and reception apparatuses and transmission and reception methods.

2. Description of the Related Art

In a three-dimensional television (3DTV) broadcasting technology, a reference image, which is a left image, and various types of additional images having 3D characteristics, which includes a right image, a depth image, and the like, are transmitted to a 3DTV through a digital broadcasting network, and the 3DTV converts the images into right and left images to be reproduced on a 3D display, providing a stereoscopic representation. As a general method to present a stereoscopic representation, a side-by-side format in which right and left images are combined into one image frame and multiplexed to be broadcasted through an existing digital network has been widely used.

However, in the side-by-side format, the right and left images are simultaneously viewed in a general 2D terminal. Thus, in order to guarantee complete backward compatibility, a method in which right and left image signals are transmitted through two virtual channels, and a packet identifier (PID) to distinguish program data representing a stereoscopic image from the right and left image signals is added, is used.

In a transmission method including addition of a PID, right and left images are respectively encoded and multiplexed into one transport stream (TS), and the TS is broadcasted through one radio frequency (RF) channel. Thus, when there are limitations on an extent of a data transmission rate effective for the RF channel, a general 2D broadcast deteriorates in quality. Particularly, in an Advanced Television Systems Committee (ATSC) format digital broadcast, an effective data transmission rate is actually about 19.36 Mbps. Thus, when the right and left images are transmitted through one RF channel, overall quality of a 2D broadcasting service deteriorates.

As described above, limitations occur when expanding broadcasting channel capacity for a high-quality broadcasting service in a 3DTV broadcast and thus, there is a desire to solve the limitations.

SUMMARY

An aspect of the present invention provides transmission and reception apparatuses, and transmission and reception methods in which a plurality of additional services share one broadcasting channel to provide a high-quality broadcasting service, such as a 3DTV, and different broadcasting channels to provide basic services are simultaneously linked to the channel to provide an efficient and high-quality service.

Another aspect of the present invention also provides transmission and reception apparatuses, and transmission and reception methods in which a broadcasting channel for a basic service is efficiently linked with a broadcasting channel for an additional service in broadcasting surroundings where a transmission bit rate for the additional service is lower than a bit rate for the basic service, such as a 3DTV.

According to an aspect of the present invention, there is provided a transmission apparatus including at least one source encoder to encode basic sources into transport streams for a basic service and to encode an additional source combined with the basic sources into a transport stream for an additional service, at least one remultiplexer to remultiplex the transport streams for the basic service into a single transport stream for the basic service, an integrated remultiplexer to remultiplex the transport stream for the additional service into a single transport stream for the additional service, at least one basic service transmission unit to broadcast the single transport stream for the basic service to a broadcasting channel for the basic service via modulation and channel-encoding, and an additional service transmission unit to broadcast the single transport stream to a broadcasting channel for the additional service via modulation and channel-encoding.

According to an aspect of the present invention, there is provided a reception apparatus including a basic service reception unit to demodulate and channel-decode a signal received through one broadcasting channel among broadcasting channels for a basic service, and to extract a transport stream provided for the basic service, an additional service reception unit to demodulate and channel-decode a signal received through a broadcasting channel for an additional service combined with the basic service, and to extract a transport stream provided for the additional service, an integrated demultiplexer to respectively demultiplex the transport stream provided for the basic service and the transport stream provided for the additional service in order to extract at least one transport stream among the transport stream for the basic service, the transport stream for the additional service, and a transport stream for service information, and a source decoder to respectively decode the demultiplexed transport stream provided for the basic service and the demultiplexed transport stream provided for the additional service in order to broadcast at least one of a basic source and an additional source combined with the basic source.

According to an aspect of the present invention, there is provided a transmission method including encoding basic sources into transport streams for a basic service, and encoding an additional source combined with the basic sources into a transport stream for an additional service, remultiplexing the transport streams for the basic service into a single transport stream for the basic service, and remultiplexing the transport stream for the additional service into a single transport stream for the additional service, and broadcasting the single transport stream for the basic service to a broadcasting channel for the basic service via modulation and channel-encoding, and broadcasting the single transport stream for the additional service to a broadcasting channel for the additional service via modulation and channel-encoding.

According to an aspect of the present invention, there is provided a reception method including demodulating and channel-decoding a signal received through one broadcasting channel among broadcasting channels for a basic service, and extracting a transport stream provided for the basic service, demodulating and channel-decoding a signal received through a broadcasting channel for an additional service combined with the basic service, and extracting a transport stream provided for the additional service, respectively demultiplexing the transport stream provided for the basic service and the transport stream provided for the additional service in order to extract at least one transport stream among the transport stream for the basic service, the transport stream for the additional service, and a transport stream for service information, and respectively decoding the demultiplexed transport stream provided for the basic service and the demultiplexed transport stream provided for the additional service in order to broadcast at least one of a basic source and an additional source combined with the basic source.

As described above, an aspect of the present invention may effectively provide a high-quality broadcasting service by linking a broadcasting channel for a basic service with a broadcasting channel for an additional service in broadcasting surroundings where a transmission bit rate for the additional service is lower than a bit rate for the basic service, such as a 3DTV.

Further, according to an aspect of the present invention, when it is difficult to obtain additional transmission capacity for a 3DTV broadcast in an existing broadcasting channel, a separate cable or wireless broadcasting channel is secured and shared by a plurality of broadcast providers, thereby providing an effective and high-quality 3DTV broadcasting service without causing deterioration of an existing broadcast.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
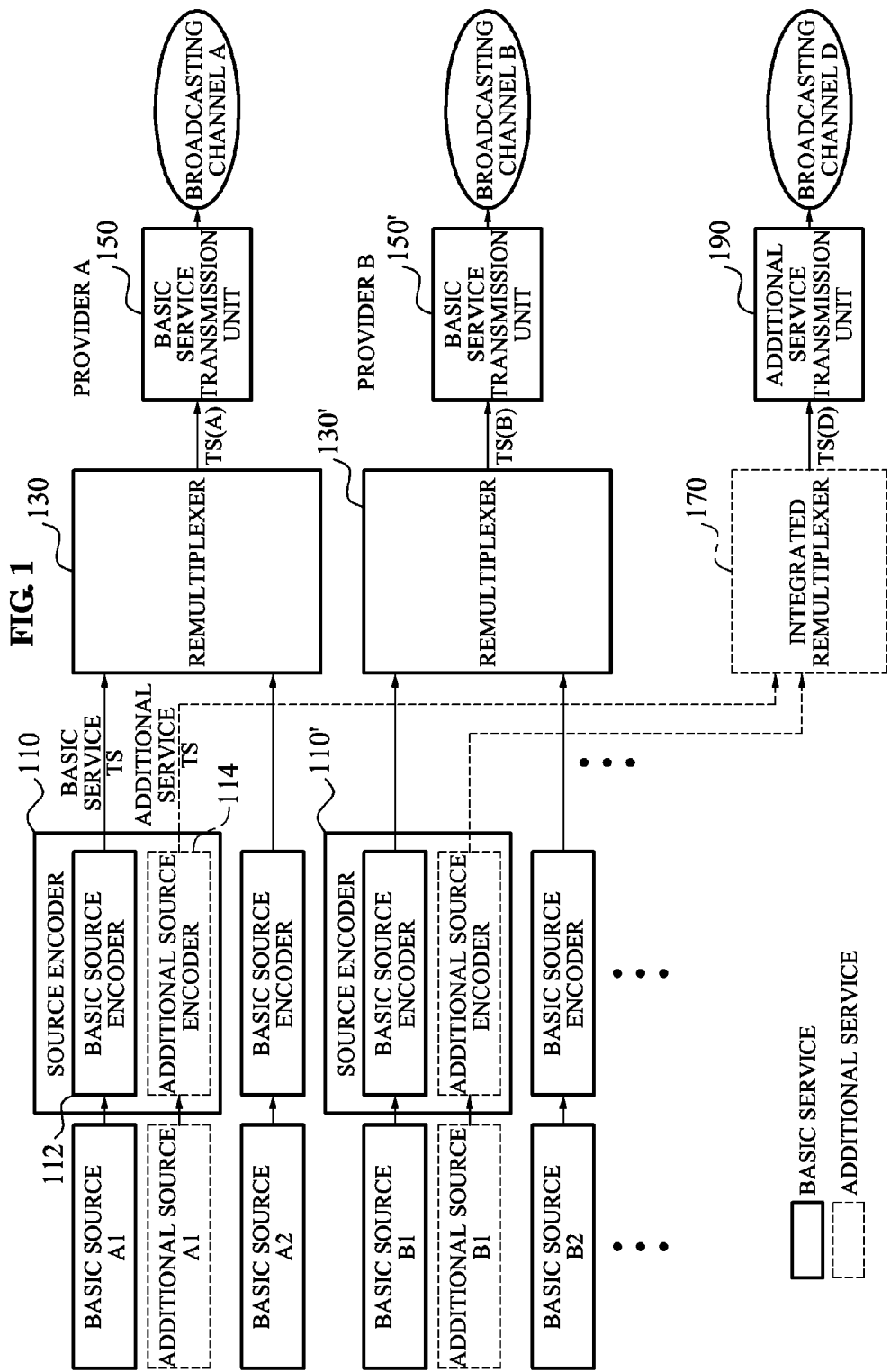
FIG. 1 is a block diagram of a transmission apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

In an embodiment of the present invention, a broadcasting channel refers to a physical transmission channel provided to each broadcast provider or network provider, and a virtual channel refers to a channel which diverges from one broadcasting channel to provide separate services.

FIG. 1 is a block diagram of a transmission apparatus according to an embodiment of the present invention. Referring to FIG. 1, the transmission apparatus according to the embodiment of the present invention includes at least one source encoder 110, at least one remultiplexer 130, at least one basic service transmission unit 150, an integrated remultiplexer 170, and an additional service transmission unit 190.

The source encoder 110 encodes basic sources into transport streams for a basic service and encodes an additional source combined to the basic sources into a transport stream for an additional service.

The source encoder 110 includes a basic source encoder 112 to encode the basic sources into the transport streams for the basic service and an additional source encoder 114 to encode the additional source combined with the basic sources into the transport stream for the additional service.

In FIG. 1, the basic sources, for example, a basic source A1, a basic source A2, and the like, refer to programs, which are content sources, provided to each broadcast provider to offer a basic service corresponding to a general broadcasting service.

The basic source encoder 112 encodes the content sources based on a standardized codec, and may encode a content source into a video and an audio, respectively, when the content source is associated with an audio-video (AV) service.

The additional source encoder 114 may operate independently of the basic source encoder 112 or may be operated subordinately to use multi-view coding and scalable video coding based on an interrelationship.

In digital broadcasting using the Advanced Television Systems Committee (ATSC) standard, when the basic source encoder 112 and the additional source encoder 114 operate independently, the basic source encoder 112 may use an MPEG-2 encoder in order to guarantee backward compatibility, and the additional source encoder 114 may use an MPEG-4 AVC encoder having high compression efficiency.

As described above, when the basic source encoder 112 uses an MPEG-2 encoder, and the additional source encoder 114 uses an MPEG-4 AVC encoder, a bit rate of the transport stream from the encoded additional source is even lower than the basic service.

As a result, the transmission apparatus may multiplex and transmit two additional services having a low bit rate which are additional sources A1 and B1 to a broadcasting channel for the additional services that is a broadcasting channel D, and may transmit basic services having a high bit rate which includes basic sources A1, A2, B1, and B2 to broadcasting channels for the basic services that are broadcasting channels A and B.

Thus, a reception apparatus or a reception terminal corresponding to the transmission apparatus simultaneously receives one of the broadcasting channels A, B, and the like for the basic services and the broadcasting channel D for the additional services, so that a high-quality broadcasting service is provided to a user.

In the present embodiment, the additional sources for a high-quality service, such as the additional source A1, the additional source B1, and the like, may be provided through the broadcasting channel for the additional services D. The broadcasting channel D for the additional services may be the same broadcasting network as the broadcasting channels for the basic services A, B, and the like, or may be a different network such as a network for an Internet protocol television (IPTV).

The basic source encoder 112 and the additional source encoder 114 may operate by a single system time clock in order to provide a high-quality service to a user. The basic source encoder 112 and the additional source encoder 114 may synchronize inserted reference clock information, for example program clock reference (PCR), and a synchronized time stamp, for example a decoding time stamp(DTS) and a presentation time stamp (PTS), into the transport streams for the basic service and the transport stream for the additional service using the same system time clock.

The basic source encoder 112 and the additional source encoder 114 synchronize a time stamp with each other so that the basic service and the additional service are performed at the same time in a recipient. For example, in a 3DTV, nearly identical stamps are inserted in each access unit (AU) of the transport streams for the basic service and in each AU of the transport stream for the additional service so that left and right images are displayed at the same time.

A descriptor to report about virtual channels linked between different broadcasting channels may be inserted into the transport streams for at least one of the basic service and the transport stream for the additional service. The descriptor to report about the linked virtual channels will be further described with reference to FIG. 2.

The remultiplexer 130 remultiplexes the transport streams of the encoded basic sources for the basic service into a single transport stream for the basic service, for example, an MPEG-2 transport stream (TS), and may multiplex programs provided to each broadcast provider.

The remultiplexer 130 may packetize and multiplex channel information and service information into a transport stream having a particular packet identification (PID).

The basic service transmission unit 150 broadcasts the single transport stream for the basic service to a broadcasting channel for the basic service via modulation and channel-encoding.

Each basic service transmission unit 150 modulates and channel-encodes the single transport stream for the basic service multiplexed into one for each broadcast provider, and broadcasts the modulated and channel-encoded single transport stream through a broadcasting channel for the basic service allocated to each broadcast provider, for example a channel A, a channel B, and the like.

The integrated remultiplexer 170 receives an encoded transport stream for an additional service from the additional source encoder 114 of each provider and remultiplexes the transport stream into a single transport stream for the additional service. The integrated remultiplexer 170 has a structure of multiplexing and transmitting the transport stream for the additional service to one physical broadcasting channel and is a type in which a plurality of broadcast providers share one broadcasting channel to transmit an individual additional service.

The remultiplexed transport stream for the additional service is channel-encoded and modulated in the additional service transmission unit 190 and is broadcasted through a separate broadcasting channel D for the additional service.

In short, the additional source A1, the additional source B1, and the like, which are associated with the basic source A1, the basic source B1, and the like of the respective providers, are encoded in the additional source encoder 114 and then are remultiplexed into a single transport stream for the additional service and broadcasted through the separate broadcasting channel D for the additional service, instead of being broadcasted through the broadcasting channels A and B for the basic service allocated to the respective providers.

When the remultiplexer 130 and the integrated remultiplexer 170 of each provider are based on an MPEG-2 system, a jitter of a PCR may be corrected while each transport stream is remultiplexed.

However, the single transport stream for the basic service and the single transport stream for the additional service, which are remultiplexed by the remultiplexer 130 and the integrated remultiplexer 170, are generated by the same system time clock, and thus synchronization of the PCR between the single transport streams which are the single stream for the basic service and the transport stream for the corresponding additional service may be continually maintained.

In digital broadcasting, detailed information about channels and services may be transmitted through at least one of program specific information (PSI), a program service information protocol (PSIP), and service information (SI). The detailed information about channels and services is packetized into a transport stream having a particular PID and is finally multiplexed by the remultiplexer 130 and the integrated remultiplexer 170.

The additional service transmission unit 190 broadcasts the single transport stream for the additional service through a broadcasting channel for the additional service via modulation and channel encoding.

In the embodiment of the present invention, the term 'service' may be referred to as a 'program' in a standard document, and a service may be provided through different virtual channels linked through one transport stream.

Figure 2:
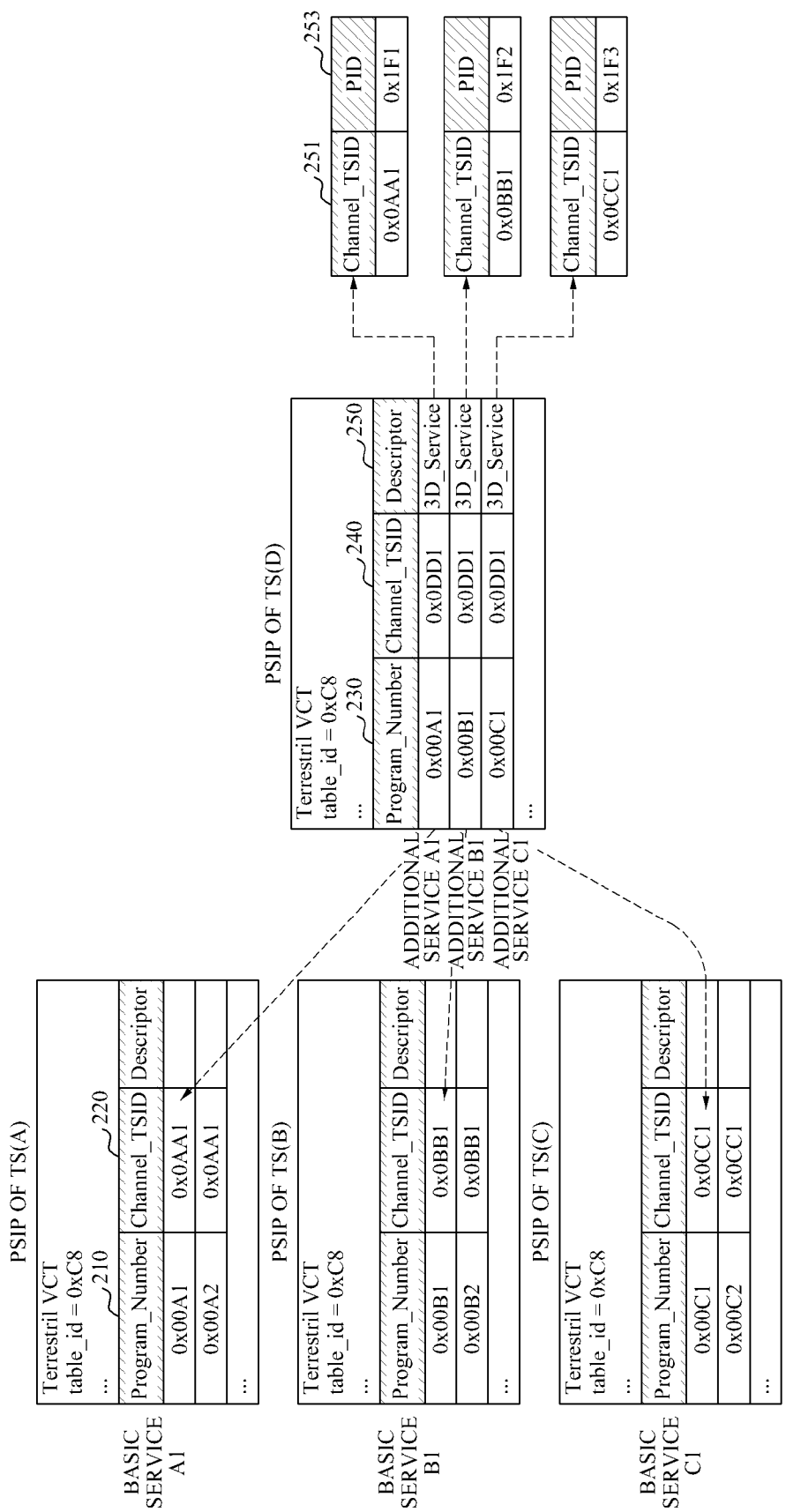
FIG. 2 illustrates a structure of a program service information protocol (PSIP) packet according to an embodiment of the present invention.

FIG. 2 illustrates a structure of a PSIP packet according to an embodiment of the present invention. Referring to FIG. 2, in the PSIP of ATSC standard document A/65C, properties of virtual channels in a transport stream are described in a virtual channel table (VCT).

In the embodiment of the present invention, a descriptor to report about virtual channels linked between different broadcasting channels may be defined as Table 1 in a descriptor loop in the VCT of the PSIP.

TABLE 1

| Construction |
| --- |
| 3D_service_descriptor ( ) {<br>descriptor_tag<br>descriptor_length<br>:<br>dependency_flag<br>If(dependency_flag) {<br>Channel_TSID<br>Elementary_PID<br>:<br>} |

When a high-quality service provided to a user is a 3DTV service, a name of the descriptor may denote a 3DTV service, and the descriptor may report to a recipient that the service is the 3DTV service through a notification of whether the descriptor exists or through a separate flag in the descriptor.

Channel_TSID 220, 240, and 251 is an indicator to report about a transport stream transmitted through different linked broadcasting channels and may be at least one of transport_stream_id in a program association table (PAT) of the transport stream and Channel_TSID in a descriptor loop of a virtual channel of the VCT.

In digital broadcasting, Channel_TSID 220, 240, and 251 has a unique value for each physical broadcasting channel, and thus Channel_TSID may be used to display a different physical channel.

Elementary_PID 253, which is a Packet Identifier, is a PID of a video transport stream in a linked virtual channel. Elementary_PID 253 may be defined by Service_location_descriptor of the VCT.

Further, Program_Number 210 and 230 that is used to distinguish programs provided through a virtual channel may be defined in the PAT and in the VCT.

In the present embodiment, Program_Number having the same value may be allocated to a basic service and a additional service so that the basic service and the additional service are identified as a single program, and Program_Number having a different value may be allocated to each of the basic service and the additional service so that the basic service and the additional service are respectively identified as expanded programs.

When Program_Number having a different value is allocated to each of the basic service and the additional service, Program_Number is input along with Channel_TSID in a statement beginning with "If" of Table 1 to display programs through different broadcasting channels. When the basic service and the additional service have the same Program_Number, Channel_TSID may distinguish programs provided through virtual channels of different broadcasting channels.

Another method of using Program_Number in the statement beginning with "If" of Table 1 is inputting source_id in the VCT.

Here, source_id is to identify a programming source in a virtual channel and thus, may be used to link sources of the basic service and the additional service.

The descriptor of Table 1 may be inserted into a transport stream for at least one of the basic service and a transport stream for the additional service. The descriptor of Table 1 may be inserted into the transport stream for the additional service in order to minimize an error in a reception apparatus currently used.

In addition to the indicator to link channels, various properties for a 3D broadcasting service including a 3D image format, left/right notification, and the like may be described in the descriptor of Table 1. The descriptor of Table 1 may be transmitted through a descriptor loop in an event information table (EIT) describing information about events, such as program titles of virtual channels, start times of programs, and the like, and through a descriptor loop in a program map table (PMT).

The EIT describes event information in a time unit and thus, the EIT may be used for conversion between 2D/3D broadcasting programs in a time unit.

As described with reference to Table 1, in the embodiment of the present invention, Channel_TSID of different broadcasting channels to be linked and Elementary_PID of a video transport stream may be inserted in 3D_service_descriptor in order to link a basic service and an additional service provided through different physical broadcasting channels.

FIG. 2 illustrates that Program_Number 210 of transport streams for basic services TS(A), TS(B), and TS(C) and Program_Number 230 of a transport stream for an additional service TS(D) use the same Program_Number, which is 0x00A1, 0x00B1, and 0x00C1, and 3D_service_descriptor 250 is inserted into the transport stream for the additional service TS(D).

3D_service_descriptor 250 may have Channel_TSID 251, 0x0AA1, 0x0BB1, and 0x0CC1, in the transport streams for the basic services to be linked TS(A), TS(B), and TS(C), and Elementary_PID 253, 0x1F1, 0x1F2, and 0x1F3, of a reference video transport stream packet in each of the transport streams.

The above description is made with a case where two virtual channels are linked. In a more general case where two or more channels are linked, a descriptor to signal the channels may be defined by the following Table 2.

TABLE 2

| Construction |
| --- |
| channel_bonding_descriptor ( ) <br> { <br> descriptor_tag <br> descriptor_length <br> : <br> service_type <br> num_bonding_channel |

TABLE 2-continued

| Construction |
| --- |
| for( i = 0; i < num_bonding_channel ; i++) <br>     channel_locator(i) <br> : <br> } |

In Table 2, descriptor_tag is an indicator to distinguish a descriptor describing channel link information. Service_type denotes a type of service provided through broadcasting channel link in the embodiment of the present invention.

For example, the service may be expressed as 0x02=TV service, 0x03=audio service, 0x10=3DTV service, 0x11=multipoint TV service, 0x20=Ultra High definition TV (UHDTV) service, and the like.

That is, a 3DTV service is practically possible through linking two channels, and a multipoint TV, a UHDTV, and the like may be designated when a plurality of channels are linked.

Num_bonding_channel denotes a number of broadcasting channels for an additional service linked to a broadcasting channel for a basic service.

Channel_locator( )displays a location of a virtual channel in a linked broadcasting channel and may be Channel_TSID, Elementary_PID, Program_Number, source_id, association_tag, which is an identifier to identify a basic stream in a program, for example, in accordance with ATSC DATA BROADCAST STANDARD (A90), and the like.

When two channels are linked as shown in FIG. 1, num_bonding_channel may be 1, channel_locator(0) may refer to a broadcasting channel for a basic service, and channel_locator(1) may refer to a broadcasting channel for an additional service. Also, num_bonding_channel may increase for a multipoint TV, a UHDTV, and the like.

Figure 3:
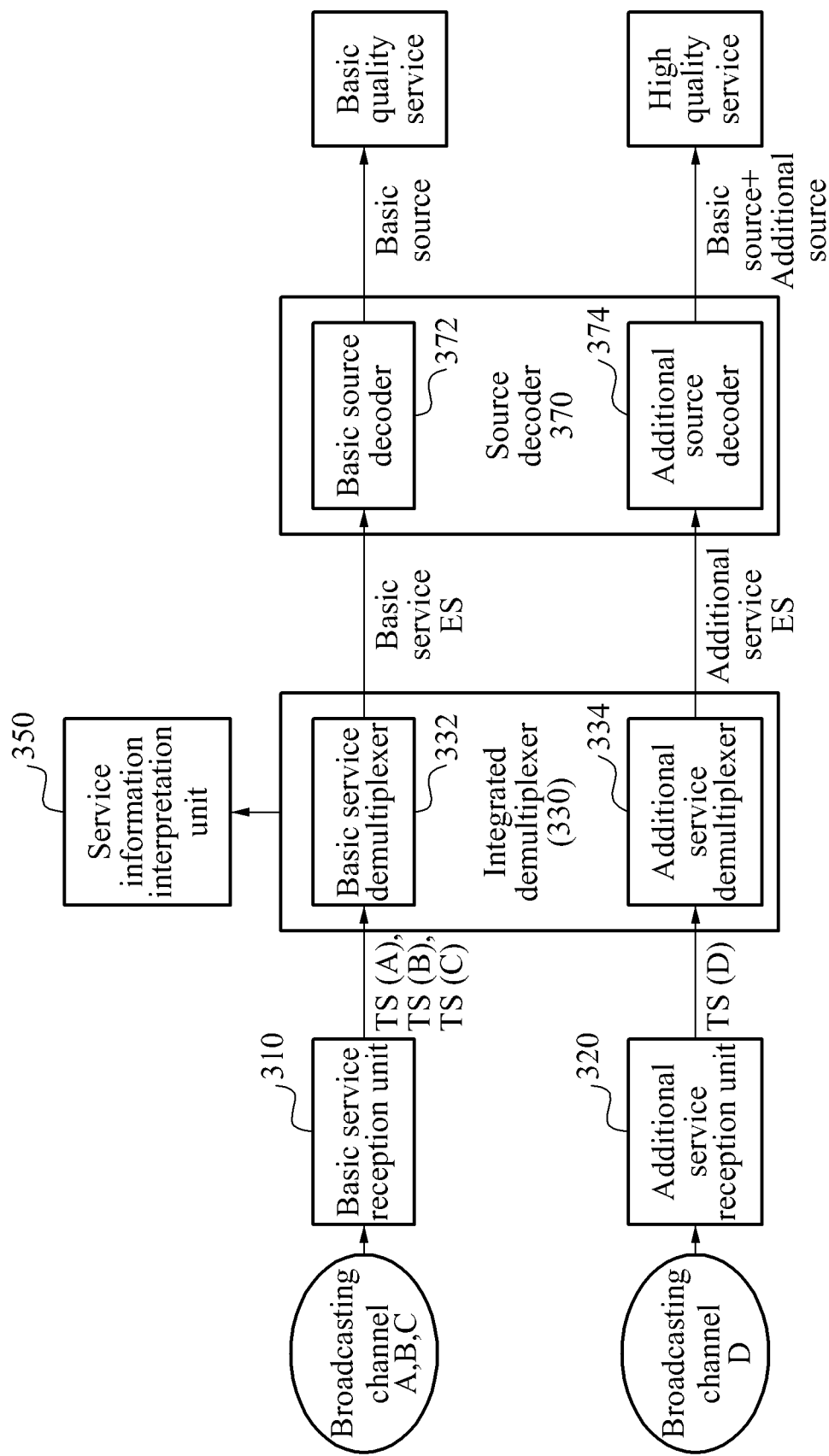
FIG. 3 is a block diagram of a reception apparatus according to an embodiment of the present invention.

FIG. 3 is a block diagram of a reception apparatus according to an embodiment of the present invention. Referring to FIG. 3, the reception apparatus according to the embodiment of the present invention includes a basic service reception unit 310, an additional service reception unit 320, an integrated demultiplexer 330, and a source decoder 370. Further, the reception apparatus of the embodiment of the present invention may further include a service information interpretation unit 350.

The basic service reception unit 310 is provided with a basic service and demodulates and channel-decodes a signal received through one broadcasting channel among broadcasting channels for the basic service, such as a broadcasting channel A, a broadcasting channel B, and the like, to extract a transport stream provided for the basic service.

The additional service reception unit 320 is provided with an additional service and demodulates and channel-decodes a signal received through a broadcasting channel for the additional service combined with the basic service, such as a signal through a broadcasting channel D, to extract a transport stream provided for the additional service.

The integrated demultiplexer 330 extracts the transport stream for the basic service, the transport stream for the additional service, and a transport stream for service information using respective demultiplexers which are a basic service demultiplexer 332 and an additional service demultiplexer 334, and synchronizes two transport streams transmitted through different broadcasting channels which are the transport stream for the basic service and the transport stream for the additional service.

The integrated demultiplexer 330 respectively demultiplexes the transport stream for the basic service and the transport stream for the additional service in order to extract at least one transport stream among the transport stream for the basic service, the transport stream for the additional service, and the transport stream for the service information.

The integrated demultiplexer 330 may synchronize the transport stream for the basic service with the transport stream for the additional service.

Further, the integrated demultiplexer 330 may include the basic service demultiplexer 332 to demultiplex the transport stream for the basic service and the additional service demultiplexer 334 to demultiplex the transport stream for the additional service. The integrated demultiplexer 330 will be further described with reference to FIG. 4.

The service information interpretation unit 350 analyzes the transport stream for the service information extracted by the integrated demultiplexer 330, such as PSIP, SI, PSI, and the like, and interprets information including at least one of a broadcasting channel, a virtual channel, and a service type linked to provide a high-quality service.

The information interpreted by the service information interpretation unit 350 may be displayed to a user through an electronic program guide (EPG). Thus, the user may select a basic-quality service or a high-quality service through the EPG.

The transport streams extracted by the integrated demultiplexer 330 are decoded by the source decoder 370.

The source decoder 370 respectively decodes the demultiplexed transport stream for the basic service and the demultiplexed transport stream for the additional service in order to broadcast at least one of a basic source and an additional source combined with the basic source.

The source decoder 370 may perform either independent decoding between a basic source decoder 372 and an additional source decoder 374, for example, MPEG-2 and MPEG-4 AVC, or perform subordinate decoding between the basic source decoder 372 and the additional source decoder 374, for example, MVC and SVC.

The source decoder 370 may provide at least one of a basic-quality service through decoding and a high-quality service through combination of the basic source and the additional source.

For example, in a 3DTV broadcasting service, the basic-quality service may be a 2D broadcast, and the high-quality service may be a 3D broadcast.

In the embodiment of the present invention, when the basic-quality service is used, only the basic service reception unit 310 and components associated with the basic service reception unit 310 may operate.

Figure 4:
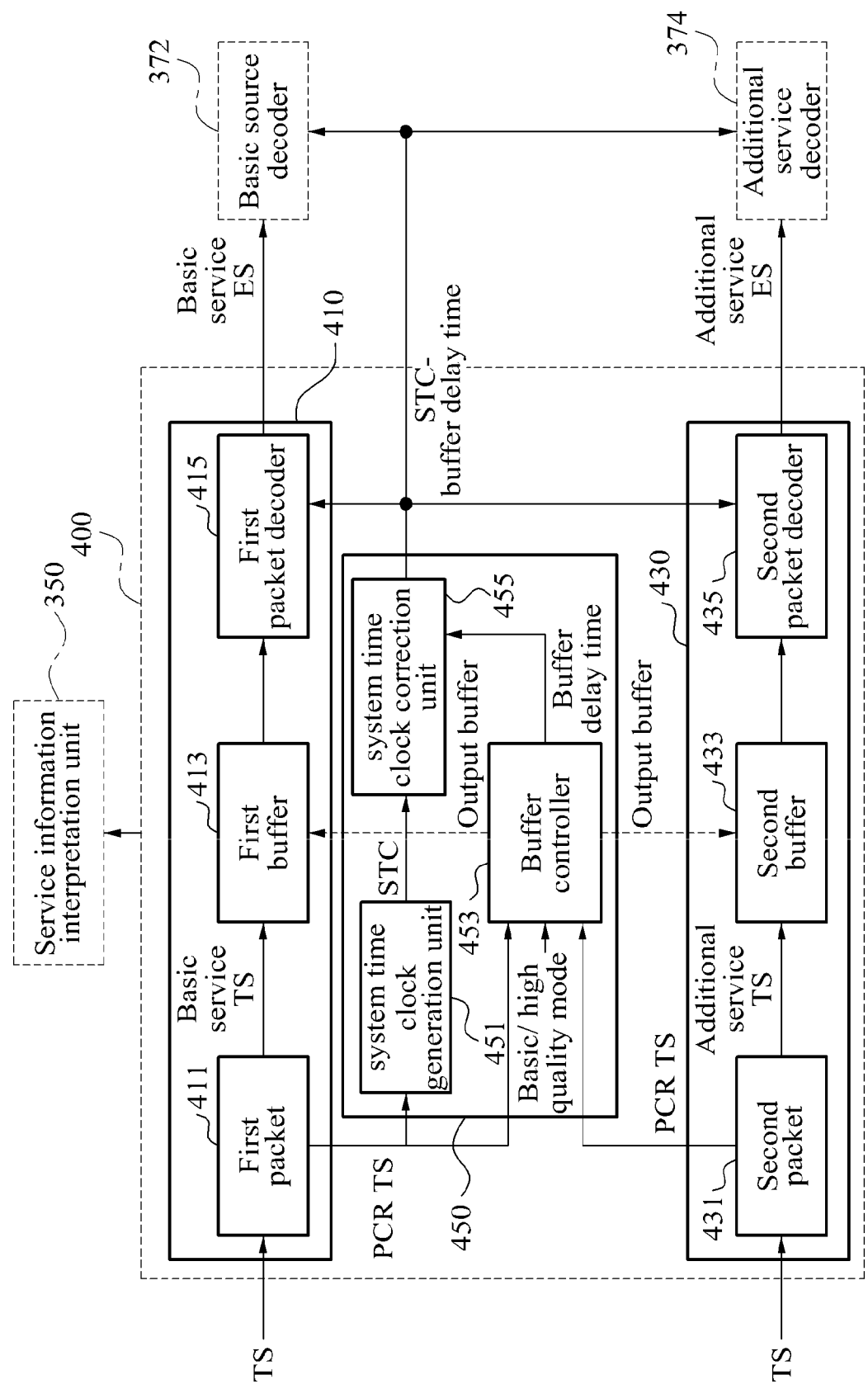
FIG. 4 is a block diagram of an integrated demultiplexer according to an embodiment of the present invention.

FIG. 4 is a block diagram of an integrated demultiplexer according to an embodiment of the present invention. Referring to FIG. 4, the integrated demultiplexer 400 according to the present embodiment includes a basic service demultiplexer 410, an additional service demultiplexer 430, and a controller 450.

The basic service demultiplexer 410 may demultiplex a transport stream provided for a basic service and include a first packet filter 411, a first buffer 413, and a first packet decoder 415.

The first packet filter 411 extracts at least one of the transport stream for the basic service and a transport stream for service information from the transport stream for the basic service.

The first packet filter 411 may extract the transport stream for the basic service from the transport stream provided for the basic service extracted by the basic service reception unit 310. In an MPEG-2 system, the first packet filter 411 may extract the transport stream (TS) for the basic service using a PID of a TS packet having a unique value for each element of each program.

Further, the first packet filter 411 may extract and transmit a packet of a particular transport stream transmitting a PCR to a system time clock generation unit 451, and extract and transmit a transport stream packet transmitting either a PSIP or SI and PSI to the service information interpretation unit 350.

The first buffer 413 temporarily stores the transport stream for the basic service so that the transport stream of the basic service and a transport stream of an additional service are performed at the same time. That is, when the transport stream for the basic service is transmitted faster than the transport stream for the additional service, the first buffer 413 allows the transport stream for the basic service to stand by until the transport stream for the additional service is transmitted.

The first packet decoder 415 decodes the transport stream for the basic service broadcasted from the first buffer 413.

The additional service demultiplexer 430 may demultiplex the transport stream provided for the additional service and include a second packet filter 431, a second buffer 433, and a second packet decoder 435.

The second packet filter 431 may extract the transport stream for the additional service from the transport stream provided for the additional service.

The second packet filter 431 may extract the transport stream for the additional service from the transport stream provided for the additional service extracted by the additional service reception unit 320. In an MPEG-2 system, the second packet filter 431 may extract the transport stream (TS) for the additional service using a PID of a TS packet having a unique value for each element of each program.

The second buffer 433 may temporarily store the transport stream for the additional service. Similar to the first buffer 413, when the transport stream for the additional service is transmitted faster than the transport stream for the basic service, the second buffer 433 enables the transport stream for the additional service to stand by until the transport stream for the basic service is transmitted.

The second packet decoder 435 may decode the transport stream for the additional service broadcasted from the second buffer 433.

The controller 450 controls the buffers so that a broadcast by the basic service demultiplexer 410 and a broadcast by the additional service demultiplexer 430 are performed at the same time, and corrects a system time clock accordingly.

The controller 450 may control whether to perform an operation of the basic service demultiplexer 410 and an operation of the additional service demultiplexer 430 based on a control mode of a service.

The controller 450 may include the system time clock generation unit 451, a buffer controller 453, and a system time clock correction unit 455.

The system time clock generation unit 451 may generate a system time clock using a PCR transport stream of the basic service extracted through the first packet filter 411.

The system time clock generation unit 451 may generate a system time clock locked with an encoder on a transmitter side using the PCR transport stream that is reference clock information in accordance with MPEG-2 system standard ITU-T Rec. H.222.

In the embodiment of the present invention, the transport stream for the basic service (basic service TS) and the transport stream for the additional service (additional service TS) are generated by the same system time clock on the transmitter side. Thus, the PCR transport stream is extracted only from the transport stream for the basic service by the first packet filter 411 to generate a system time clock, and the system time clock may be used as a clock for an entire system.

Here, the transport stream for the basic service and the transport stream for the additional service are generated in parallel in the source encoder 110, but may have different delay periods while the transport streams are transmitted through different channels of a broadcasting network.

Thus, in the embodiment of the present invention, the first buffer 413, the second buffer 433, the buffer controller 453, and the system time clock correction unit 455 are used to compensate for the delay periods, so that the basic source decoder 372 and the additional source decoder 374 perform synchronized decoding to implement the basic service and the additional service at the same time.

The buffer controller 453 may store the transport streams input to the first buffer 413 and the second buffer 433, may compare the PCR transport stream of the basic service with a PCR transport stream of the additional service extracted through the second packet filter 431, and may control a a time period used for broadcasting the transport stream for the basic service and the transport stream for the additional service.

That is, the buffer controller 453 may buffer a prior PCR transport stream among the PCR transport stream of the basic service and the PCR transport stream of the additional service based on the comparison result to delay, so that the transport stream of the basic service and the transport stream of the additional service are broadcasted at the same time.

The system time clock correction unit 455 may correct the system time clock with respect to a transport stream of a service delayed in transmission due to a delay in the first buffer 413 and the second suffer 433 based on the comparison result of the PCR transport streams.

A system time clock corrected to be the simplest may be obtained by a difference between an input system time clock and a delay time in a buffer, expressed as "system time clock-buffer delay time." Here, the system time clock may be locked with the source encoder of the transmission apparatus corresponding to the reception apparatus.

The controller 450, specifically the buffer controller 453, may receive input of a control mode of a basic/high quality service controlled by service information either input by a user or received from the transmitter side.

When the control mode of the basic/high quality service is selected as a basic mode to instruct a broadcast of the basic service, the buffer controller 453 operates only blocks to provide the basic service.

When a service mode is selected as the basic mode, there are no need for synchronization of the basic service with the additional service and no need for an additional delay process in the buffers, and thus the buffer controller 453 controls the first buffer 413 to broadcast the transport stream for the basic service immediately when the transport stream is input to the first buffer 413.

In a 3DTV broadcasting service, a basic/high quality service mode may correspond to a 2D/3D mode to select a 2D or 3D service. Here, when a change is made from the 2D mode to the 3D mode or from the 3D mode to the 2D mode, a broadcasting point of a buffer may be changed to cause a screen freeze. However, in a 3DTV with glasses, a relatively short period of time to put on or take off the glasses is used and thus, the screen freeze is not visually problematic.

When a screen freeze occurs, the controller 450 may provide, to a user, a message on a screen reporting that a 3DTV service starts or terminates during the screen freeze.

Figure 5:
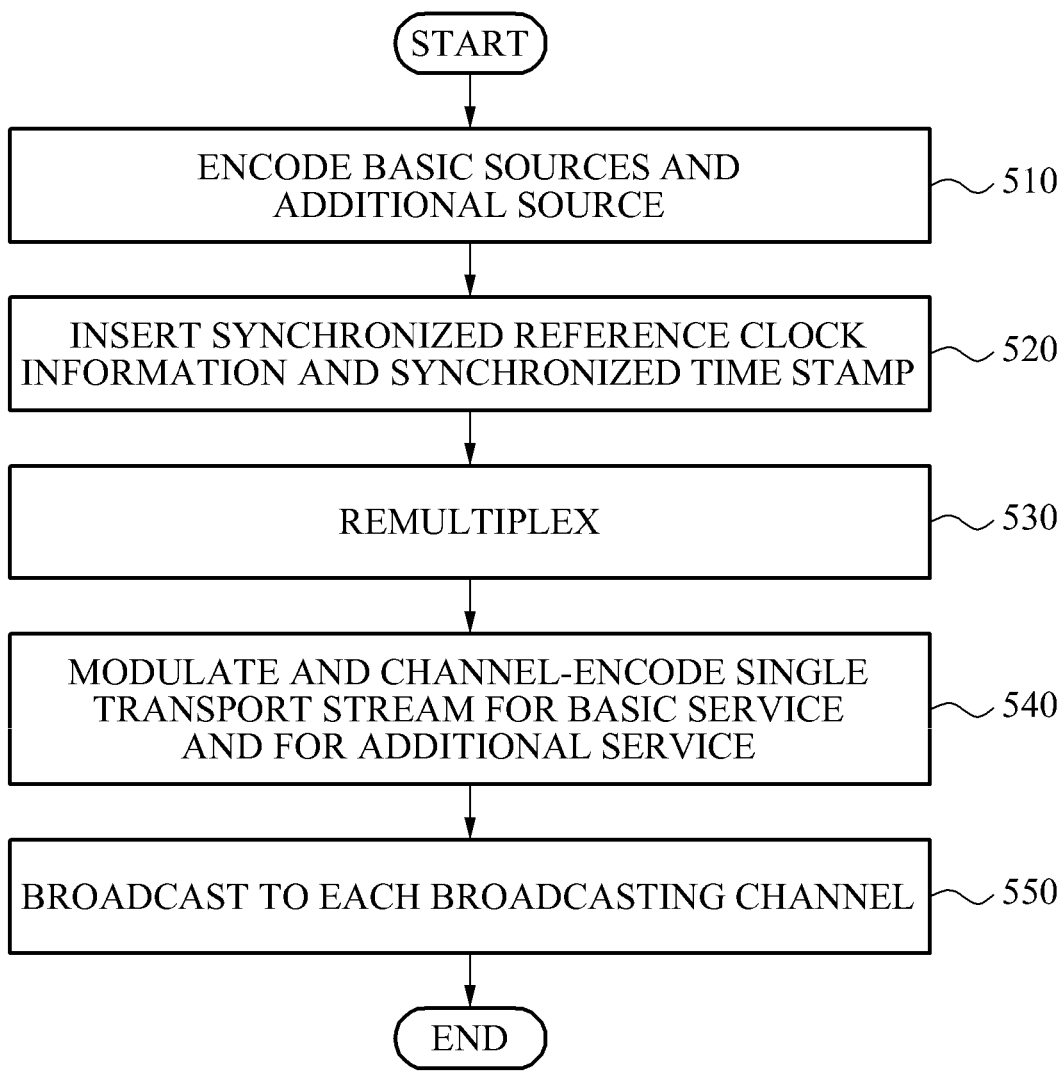
FIG. 5 is a flowchart illustrating a transmission method according to an embodiment of the present invention.

FIG. 5 is a flowchart illustrating a transmission method according to an embodiment of the present invention.

Referring to FIG. 5, the transmission apparatus encodes basic sources into transport streams for a basic service, and encodes an additional source combined with the basic sources into a transport stream for an additional service in operation 510.

Here, the transmission apparatus may respectively insert synchronized reference clock information and a synchronized time stamp into the transport streams for the basic service and the transport stream for the additional service using the same system time clock in operation 520.

The transmission apparatus remultiplexes the transport streams for the basic service into a single transport stream for the basic service and remultiplexes the transport steam for the additional service into a single transport stream for the additional service in operation 530.

The transmission apparatus modulates and channel-encodes the single transport stream for the basic service and the single transport stream for the additional service in operation 540.

The transmission apparatus broadcasts the single transport stream for the basic service to a broadcasting channel for the basic service and broadcasts the single transport stream for the additional service to a broadcasting channel for the additional service in operation 550.

Figure 6:
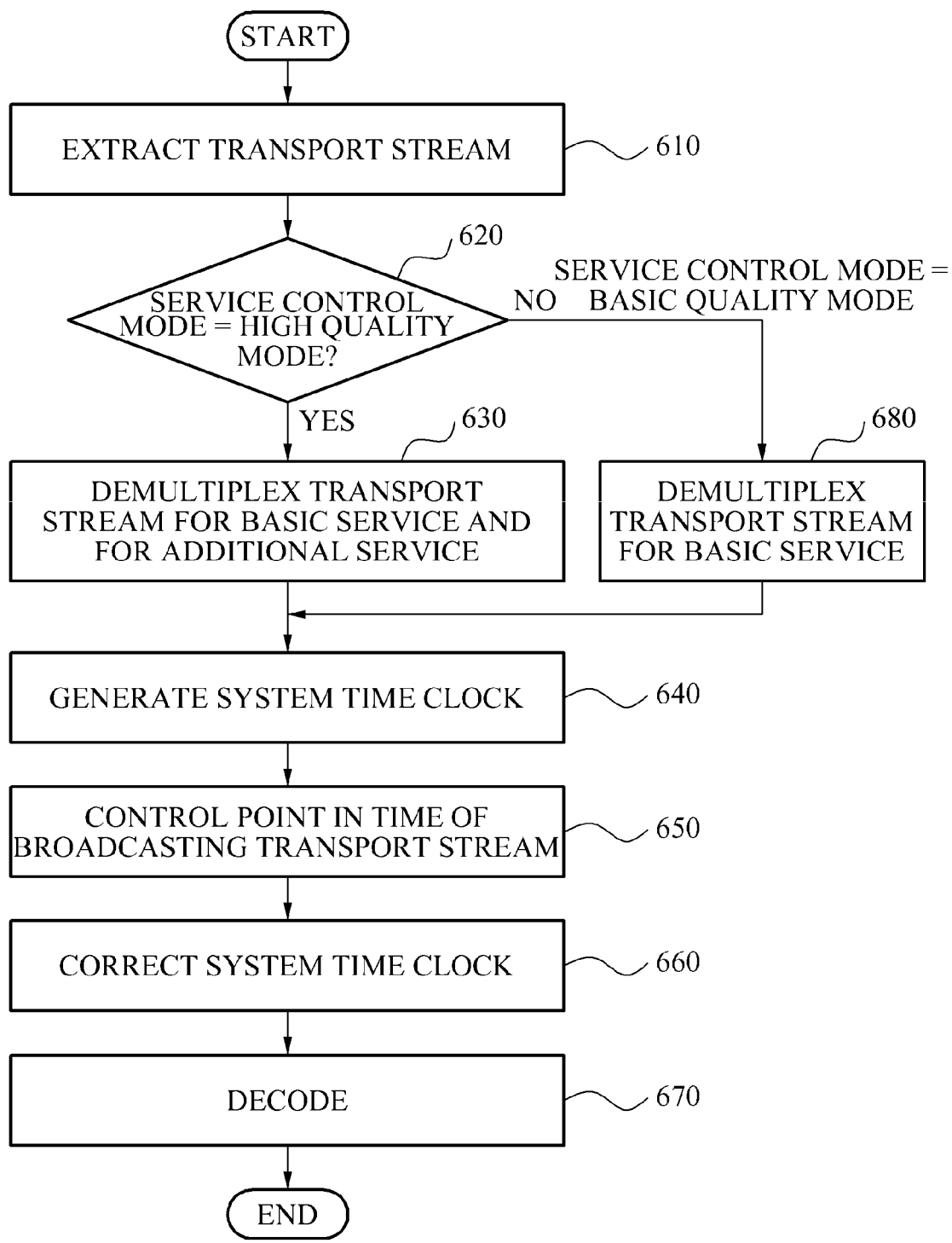
FIG. 6 is a flowchart illustrating a reception method according to an embodiment of the present invention.

FIG. 6 is a flowchart illustrating a reception method according to an embodiment of the present invention.

Referring to FIG. 6, the reception apparatus demodulates and channel-decodes a signal received through one broadcasting channel among broadcasting channels for a basic service to extract a transport stream provided for the basic service, and demodulates and channel-decodes a signal received through a broadcasting channel for an additional service combined with the basic service to extract a transport stream provided for the additional service in operation 610.

The reception apparatus may control whether to demultiplex the transport stream provided for the basic service and the transport stream provided for the additional service based on a control mode of a service.

That is, the reception apparatus determines whether the control mode of the service is a high-quality mode in operation 620. Then, when the control mode of the service is the high-quality mode, the reception apparatus demultiplexes both the transport stream provided for the basic service and the transport stream provided for the additional service in operation 630.

When the control mode of the service is a basic mode as opposed to the high-quality mode, the reception apparatus demultiplexes only the transport stream provided for the basic service in operation 680, and then performs operation 640 and subsequent operations.

The reception apparatus may respectively demultiplex the transport stream provided for the basic service and the transport stream provided for the additional service to extract at least one transport stream among the transport stream for the basic service, the transport stream for the additional service, and a transport stream for service information.

Further, the reception apparatus may analyze the transport stream for the service information and interpret information including information about at least one of a linking broadcasting channel, information about a virtual channel, and a service type.

The reception apparatus may control a system time clock so that the demultiplexing of the transport stream for the basic service and the demultiplexing of the transport stream for the additional service are performed in parallel.

The reception apparatus may generate a system time clock using a PCR transport stream of the basic service extracted by the first packet filter to control the system time clock in operation 640.

Then, the reception apparatus may compare the PCR transport stream of the basic service extracted by the first packet filter with a PCR transport stream of the additional service extracted by the second packet filter, and may control a time period used for broadcasting the transport stream for the basic service and the transport stream for the additional service in operation 650.

Here, the reception apparatus may correct the system time clock with respect to a transport stream of a service delayed in transmission based on a comparison result of the PCR transport stream of the basic service with the PCR transport stream of the additional service in operation 660.

The reception apparatus respectively decodes the demultiplexed transport stream provided for the basic service and the demultiplexed transport stream provided for the additional service to broadcast at least one of a basic source and an additional source combined with the basic source in operation 670.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A reception apparatus comprising:
a basic service reception unit to demodulate and channel-decode code a signal received through a first physical broadcasting channel among broadcasting channels for a basic service, to extract a transport stream provided for the basic service;
an additional service reception unit to demodulate and channel-decode a signal received through a different broadcasting channel for an additional service combined with the basic service, and to extract a transport stream provided for the additional service;
an integrated demultiplexer to respectively demultiplex the transport stream provided for the basic service and the transport stream provided for the additional service in order to extract at least one transport stream among the transport stream for the basic service, the transport stream for the additional service, and a transport stream for service information, the integrated demultiplexer synchronizing the transport stream for the basic service and the transport stream for the additional service using synchronization information included in the respective streams, the synchronization information including at least one of synchronized reference clock information and synchronized time stamp information for the basic service and for the additional service that was generated using the same system time clock; and
a source decoder to respectively decode the demultiplexed transport stream provided for the basic service and the demultiplexed transport stream provided for the additional service in order to broadcast at least one of a basic source and an additional source combined with the basic source,
wherein the integrated demultiplexer includes:
a basic service demultiplexer to demultiplex the transport stream for the basic service;
an additional service demultiplexer to demultiplex the transport stream for the additional service; and
a controller to control a system time clock so that a broadcast by the basic service demultiplexer and a broadcast by the additional service demultiplexer are performed at the same time, and
wherein the controller includes:
a system time clock generation unit to generate a system time clock using a program clock reference (PCR) transport stream of the basic service extracted through the first packet filter;
a buffer controller to compare the PCR transport stream of the basic service with a PCR transport stream of the additional service extracted through the second packet filter, and to control a time period used for broadcasting the transport stream for the basic service and the transport stream for the additional service; and
a system time clock correction unit to correct the system time clock with respect to a transport stream of a service delayed in transmission based on a comparison result of the PCR transport streams.

2. The reception apparatus of claim 1, further comprising a service information interpretation unit to analyze the transport stream for the service information extracted by the integrated demultiplexer, and to interpret information including at least one of a linking broadcasting channel, a virtual channel, and a service type.

3. The reception apparatus of claim 1, wherein the integrated demultiplexer synchronizes the transport stream for the basic service with the transport stream for the additional service.

4. The reception apparatus of claim 1, wherein the controller controls whether to perform an operation of the basic service demultiplexer and an operation of the additional service demultiplexer based on a control mode of a service.

5. The reception apparatus of claim 1, wherein the controller provides, to a user, a message reporting that a three-dimensional (3D) TV service either starts or terminates during a screen freeze when a screen freeze occurs due to at least one of a change from a two-dimensional (2D) mode to a 3D mode and a change from the 3D mode to the 2D mode.

6. The reception apparatus of claim 1, wherein the basic service demultiplexer comprises:
- a first packet filter to extract the transport stream for at least one of the basic service and the transport stream for the service information from the transport stream for the basic service;
- a first buffer to temporarily store the transport stream for the basic service; and
- a first packet decoder to decode the transport stream for the basic service broadcasted from the first buffer, and the additional service demultiplexer comprises:
- a second packet filter to extract the transport stream for the additional service from the transport stream for the additional service;
- a second buffer to temporarily store the transport stream for the additional service; and
- a second packet decoder to decode the transport stream for the additional service broadcasted from the second buffer.

7. The reception apparatus of claim 1, wherein the buffer controller buffers a prior PCR transport stream among the PCR transport stream of the basic service and the PCR transport stream of the additional service based on the comparison result to delay, so that the transport stream of the basic service and the transport stream of the additional service are transmitted at the same time.

8. A reception method comprising:
- demodulating and channel-decoding a signal received through a first physical broadcasting channel among broadcasting channels for a basic service, and extracting a transport stream provided for the basic service;
- demodulating and channel-decoding a signal received through a different broadcasting channel for an additional service combined with the basic service, and extracting a transport stream provided for the additional service;
- respectively demultiplexing the transport stream provided for the basic service and the transport stream provided for the additional service with an integrated demultiplexer in order to extract at least one transport stream among the transport stream for the basic service, the transport stream for the additional service, and a transport stream for service information, the integrated demultiplexer synchronizing the transport stream for the basic service and the transport stream for the additional service using synchronization information included in the respective streams, the synchronization information including at least one of synchronized reference clock information and synchronized time stamp information for the basic service and for the additional service that was generated using the same system time clock;
- respectively decoding the demultiplexed transport stream provided for the basic service and the demultiplexed transport stream provided for the additional service in order to broadcast at least one of a basic source and an additional source combined with the basic source, and
- controlling the system time clock by
  - generating a system time clock using a program clock reference (PCR) transport stream of the basic service;
  - comparing the PCR transport stream of the basic service with a PCR transport stream of the additional service, and controlling a time period used for broadcasting the transport stream for the basic service and the transport stream for the additional service; and
  - correcting the system time clock with respect to a transport stream of a service delayed in transmission based on a comparison result of the PCR transport streams.

9. The reception method of claim 8, further comprising analyzing the transport stream for the service information and interpreting information including at least one of a linking broadcasting channel, a virtual channel, and a service type.

10. The reception method of claim 8, wherein the demultiplexing comprises:
- demultiplexing the transport stream for the basic service, and demultiplexing the transport stream for the additional service; and
- controlling a system time clock so that the demultiplexing is performed at the same time.

11. The reception method of claim 10, further comprising controlling whether to perform an operation of the basic service demultiplexer and an operation of the additional service demultiplexer based on a control mode of a service.

* * * * *